(12) United States Patent
Ho

(10) Patent No.: US 9,389,762 B2
(45) Date of Patent: Jul. 12, 2016

(54) METHOD FOR UNLOCKING TOUCH SCREEN, ELECTRONIC DEVICE THEREOF, AND RECORDING MEDIUM THEREOF

(71) Applicant: EGALAX_EMPIA TECHNOLOGY INC., Taipei (TW)

(72) Inventor: Shun-Lung Ho, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 84 days.

(21) Appl. No.: 14/091,518

(22) Filed: Nov. 27, 2013

(65) Prior Publication Data

US 2014/0145990 A1    May 29, 2014

(30) Foreign Application Priority Data

Nov. 29, 2012    (TW) .............................. 101144621 A

(51) Int. Cl.
    *G06F 3/0484*    (2013.01)
    *G06F 3/0488*    (2013.01)

(52) U.S. Cl.
    CPC .......... *G06F 3/0484* (2013.01); *G06F 3/04883* (2013.01)

(58) Field of Classification Search
    CPC .. G06F 3/0416; G06F 3/04883; G06F 3/0484
    See application file for complete search history.

(56) References Cited

U.S. PATENT DOCUMENTS

| | | | | |
|---|---|---|---|---|
| 8,749,516 B2* | 6/2014 | Kim et al. | ...................... | 345/174 |
| 2007/0150842 A1* | 6/2007 | Chaudhri et al. | ............. | 715/863 |
| 2008/0165141 A1* | 7/2008 | Christie | ........................ | 345/173 |
| 2008/0278455 A1* | 11/2008 | Atkins et al. | ................... | 345/173 |
| 2010/0127998 A1* | 5/2010 | Hyun | .............................. | 345/173 |
| 2011/0088086 A1* | 4/2011 | Swink et al. | ....................... | 726/7 |
| 2012/0098639 A1* | 4/2012 | Ijas | ....................... | G06F 3/04883 340/5.51 |
| 2013/0063380 A1* | 3/2013 | Wang et al. | .................... | 345/173 |
| 2013/0069893 A1* | 3/2013 | Brinda et al. | .................. | 345/173 |
| 2013/0076649 A1* | 3/2013 | Myers et al. | ................... | 345/173 |
| 2013/0162571 A1* | 6/2013 | Tamegai | ............... | G06F 3/0412 345/173 |
| 2013/0205210 A1* | 8/2013 | Jeon et al. | ...................... | 715/716 |
| 2013/0219310 A1* | 8/2013 | Lee et al. | ....................... | 715/764 |
| 2013/0298079 A1* | 11/2013 | Kim | ................................ | 715/810 |
| 2013/0321305 A1 | 12/2013 | Liang et al. | | |
| 2013/0321308 A1* | 12/2013 | Lee et al. | ....................... | 345/173 |
| 2014/0035843 A1* | 2/2014 | Zo et al. | ......................... | 345/173 |
| 2014/0253476 A1* | 9/2014 | Chiu et al. | ..................... | 345/173 |
| 2014/0298672 A1* | 10/2014 | Straker et al. | .................... | 34/175 |

FOREIGN PATENT DOCUMENTS

| | | |
|---|---|---|
| CN | 101482794 | 7/2009 |
| CN | 102722331 A | 10/2012 |

* cited by examiner

*Primary Examiner* — Christopher E Leiby

(74) *Attorney, Agent, or Firm* — WPAT, PC; Justin King; Jonathan Chiang

(57) ABSTRACT

A method for unlocking touch screen, electronic device thereof, and recording medium thereof are disclosed. A graph with a boundary is displayed on a touch screen. Then two fingers touch the outside, the inside or the boundary of the graph and move outward or inward separately. Whether the touch screen of the electronic device is unlocked is determined based on whether the distance between the moved two fingers is larger or smaller than a default value, or whether the distance difference between the two fingers before and after moving is larger than a default value.

17 Claims, 20 Drawing Sheets

METHOD FOR UNLOCKING TOUCH SCREEN, ELECTRONIC DEVICE THEREOF, AND RECORDING MEDIUM THEREOF

CROSS REFERENCE TO RELATED APPLICATIONS

This patent application claims the benefit of Taiwan Application Serial No. 101144621, filed on Nov. 29, 2012, which is herein incorporated by reference for all intents and purposes.

BACKGROUND OF THE INVENTION

1. Field of the Invention

The present invention relates to method for unlocking a touch screen and, more particularly, to method, electronic device and recording medium for unlocking a touch screen.

2. Description of the Prior Art

In recent years, electronic devices become popular as the semiconductor industry develops. Various smart mobile devices, such as smart phones, personal digital assistants (PDA), and tablet PCs are part of everyday life making life more convenient with their strong computation capability. Generally speaking, the above mentioned smart phones use buttons on touch screen instead of traditional mechanical buttons.

For example, the touch screen of the electronic device, such as the smart phone, switches to a sleep mode or a locking mode after the electronic device stands idle in a period of time. Hence, the electronic device would not consume any unnecessary power and would not be operated by an accident touch of a user. When a user wants to use a certain function of the electronic device and the electronic device is in the locking mode, the user needs to unlock the touch screen to activate the electronic device.

There are many methods to unlock the touch screen. For example, a user may slide laterally or vertically on the touch screen, slide on the touch screen with a specific slide path, or key in a specific password to unlock and activate the touch screen. However, a user can not directly use the specific function after unlocking the touch screen and need to click many different icons under different function layers to start the desired function. That is, a user can not directly access the interface of the desired function according to the user's habit after unlocking the touch screen. For example, when a user wants to listen to music or take pictures, the user may need to unlock the touch screen through one of the unlocking methods mentioned above at first. Then, a user may click many different icons in different function layers to enable the application. This is not convenient.

Accordingly, the present invention discloses a method for unlocking a touch screen. Users can unlock the locked touch screen by touch or gesture on the locked touch screen so as to enhance the convenience for unlocking the touch screen.

SUMMARY OF THE INVENTION

In accordance with an embodiment of the present invention, the present invention provides a method for unlocking a touch screen. The touch screen consists of a touch panel and a display. The touch panel and the display could be integrated by add-on manufacturing process, or the touch panel could be integrated in the display (e.g. in-cell touch screen) or integrated on the display (e.g. on-cell touch screen) during the display manufacturing process. The method comprises the following steps: determining a first relative distance between two touch signals when the two touch signals are determined by the touch screen; determining a second relative distance between the two touch signals after at least one of the two touch signals moves; and unlocking the touch screen, which is locked, while a difference between the first relative distance and the second relative distance is larger than a default value.

The present invention further discloses another one method for unlocking a touch screen of an electronic device, comprising: determining a relative distance between two touch signals while at least one of the two touch signals moves on the touch screen; and unlocking the touch screen, which is locked, while the relative distance is larger than or smaller than a default value.

Accordingly, the present invention further discloses an electronic device for unlocking a touch screen, comprising: the touch screen; and a processor, executing the following operations: determining a first relative distance between two touch signals when the two touch signals are determined by the touch screen; determining a second relative distance between the two touch signals after at least one of the two touch signals moves; and unlocking the touch screen, which is locked, when a difference between the first relative distance and the second relative distance is larger than a default value.

The present invention further discloses another one electronic device for unlocking a touch screen, comprising: the touch screen; and a processor, executing the following operations: determining a relative distance between two touch signals while at least one of the two touch signals moves on the touch screen; and unlocking the touch screen, which is locked, while the relative distance is larger than or smaller than a default value.

In accordance with another embodiment of the present invention, the present invention provides a computer-readable recording medium for storing a computer program. The computer program includes a plurality of source codes, and the source codes could be loaded into the electronic device so as to unlock the touch screen by the electronic device.

DETAILED DESCRIPTION OF THE PREFERRED EMBODIMENTS

Figure 1A:
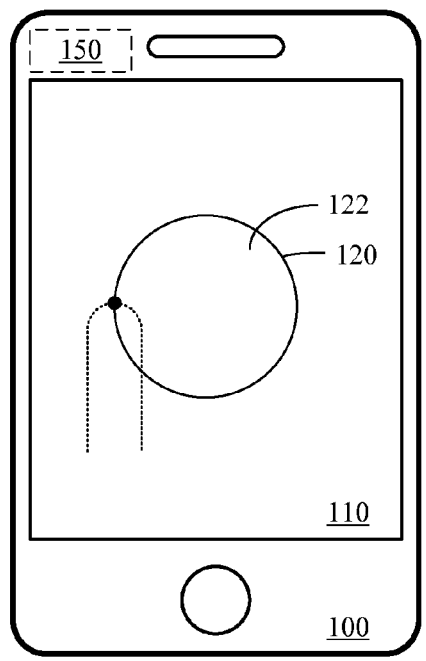
FIGS. 1A to 12C are schematic diagrams of an electronic device for unlocking a touch screen according to embodiments of the present invention.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

According to one embodiment of the present invention, when a locked touch screen of a smart phone needs to be unlocked, a user's one finger touches the touch screen at first, and then the touch screen displays an operation frame for unlock the locked touch screen. In this embodiment, the operation frame includes a graph with a boundary, wherein the boundary of the graph could be a closed curve, for example, a bubble with a boundary.

Next, the user's two fingers could touch the outside, the inside or the boundary of a bubble, and then the two fingers could move outward or inward so as to expand outward or reduce inward the boundary of the bubble with the move of the two fingers. When the distance between the two fingers is larger or smaller than a default value, or the difference between a first distance between the two fingers before moving, and a second distance between the two fingers after moving is larger than a default value, the touch screen displays that the bubble is broken and then disappears, and the locked touch screen is unlocked simultaneously. It looks like that the bubble is broken by pulling outward or pinching inward by the two fingers so as to unlock the touch screen. The previous example of the bubble is convenient to explain the present invention, and the scope of the present invention is not limited by such, rather by the scope of the claims. One with ordinary skill in the art can appreciate another kind of graph so that a first graph represents the locked state of the touch screen, and a second graph represents the unlocked state of the touch screen. In other words, the transformation from the first graph to the second graph is operated based on the movement of the two fingers, that is to say, the touch screen is unlocked based on the operations of the two fingers.

Figure 1B:
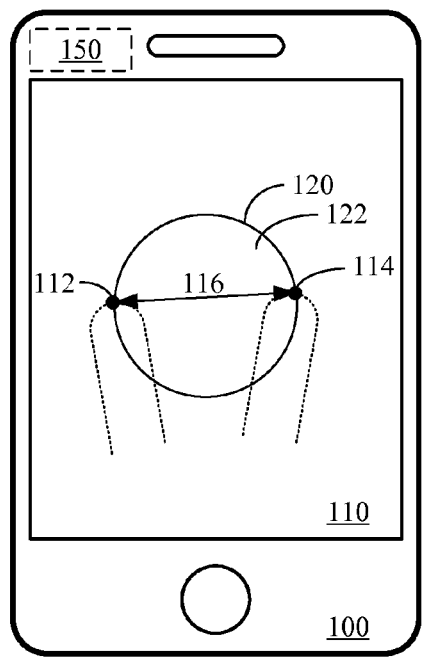
Figure 1C:
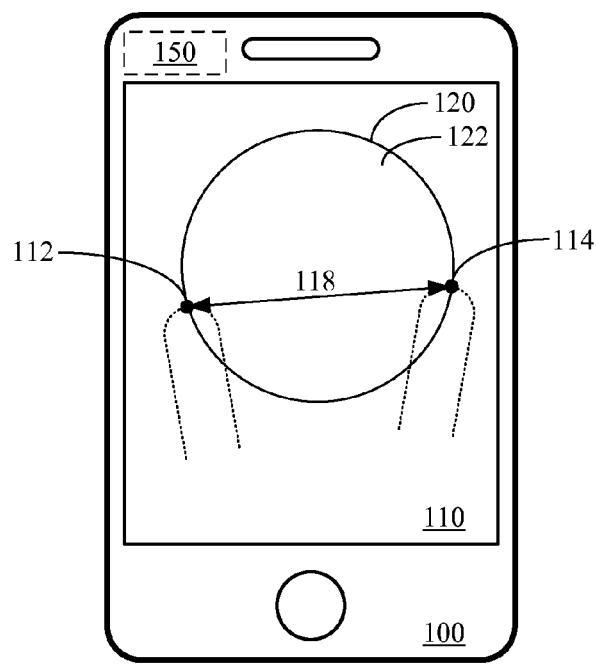

According to the previous embodiment, the present invention provides an electronic device 100 for unlock a touch screen. In this invention, the electronic device 100 could be a cell phone, a PDA, a smart phone and so on. The scope of the present invention is not limited by such, rather by the scope of the claims. The electronic device 100 includes a touch screen 110 and a processor 150, as shown in FIG. 1B and FIG. 1C. The processor 150 executes the following operations. At first, when the touch screen 110 detects two touch signals 112, 114, a first relative distance 116 between the two touch signals 112, 114 is determined. Then, after at least one of the two touch signals 112, 114 moves, a second relative distance 118 between the two touch 112, 114 signals is determined. Next, while a difference between the first relative distance 116 and the second relative distance 118 is larger than a default value, the touch screen 110 is unlocked.

For displaying an operation frame to unlock the touch screen 110 before the touch screen 110 detects both touch signals 112, 114, the processor 150 further executes the following operations. As shown in FIG. 1A, when the locked touch screen 110 detects at least one touch signal, the processor 150 controls that the touch screen 110 displays a graph with a boundary, wherein the graph could be a closed curve, for example, a bubble 122 with a boundary 120. Finally, when the processor 150 unlocks the locked touch screen 110, the processor 150 vanishes the graph (bubble 122).

The boundary 120 changes with the moving track of the two touch signals 112, 114 as one of the following states: the processor 150 controls that the diameter of the boundary 120 decreases step by step with the decrease of the second relative distance 118 when the first relative distance 116 is larger than the second relative distance 118; and the processor 150 controls that the diameter of the boundary 120 increases step by step with the increase of the second relative distance 118 when the first relative distance 116 is smaller than the second relative distance 118.

According to a best mode of the present invention, as shown in FIG. 1A to FIG. 1C, when a user wants to unlock the locked touch screen 110 of a smart phone (electronic device 100), the user's one finger (the previous at least one touch signal is generated due to the finger) touches the touch screen 110 at first so as to display an operation frame on the locked touch screen 110 for unlocking the locked state. In this embodiment, the operation frame includes a graph with a boundary, wherein the graph with the boundary could be a closed curve, for example, a bubble 122 with a boundary 120. Then, the user's two fingers (the previous two touch signals 112, 114 are generated due to the two fingers) could touch the boundary 120 of the bubble 122, and then the two fingers separately move outward so as to expand the boundary 120 of the bubble 122 with the outward movement of the two fingers. When the difference between a first distance between the two fingers before moving, and a second distance between the two fingers after moving is larger than a default value, the touch screen 110 is unlocked and simultaneously displays that the bubble 122 is broken and then disappears. It looks like that the bubble 122 is broken by pulling outward by the two fingers so as to unlock the touch screen 110.

Figure 2A:
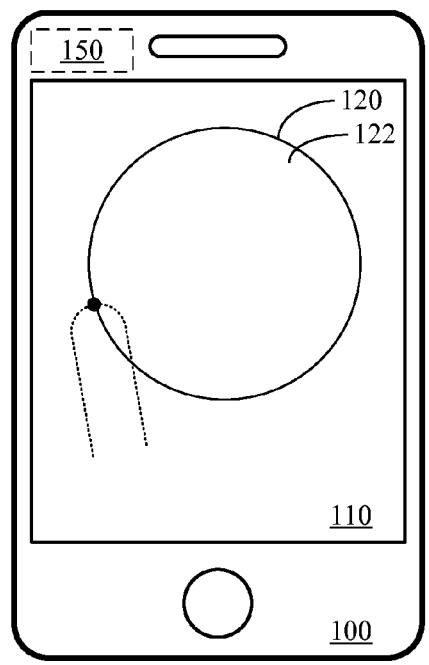
Figure 2B:
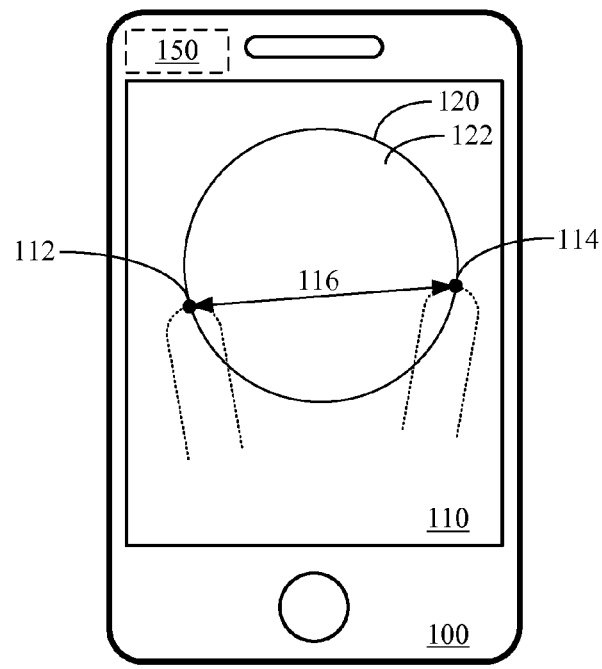
Figure 2C:
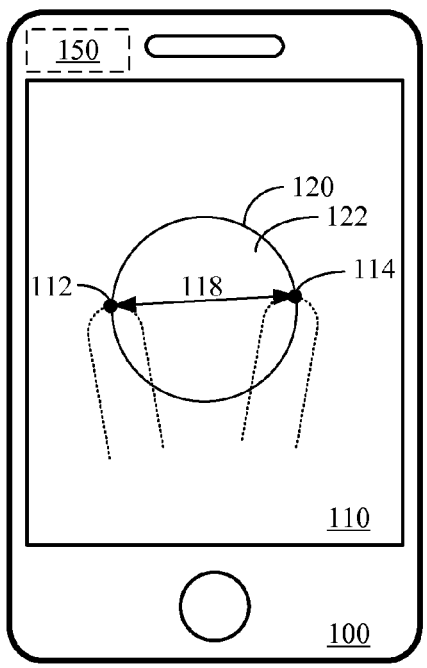

According to another one embodiment of the present invention, when a user wants to unlock the locked touch screen 110 of a smart phone, the user's one finger touches the touch screen 110 at first so that the locked touch screen 110 displays a bubble 122 with a boundary 120, as shown in FIG. 2A. Then, as shown in FIG. 2B and FIG. 2C, the user's two fingers could touch the boundary 120 of the bubble 122, and then the two fingers separately move inward so as to reduce the boundary 120 of the bubble 122 with the inward movement of the two fingers. When the difference between a first distance between the two fingers before moving, and a second distance between the two fingers after moving (the difference between the first relative distance 116 and the second relative distance 118) is larger than a default value, the touch screen 110 is unlocked and simultaneously displays that the bubble 122 is broken and then disappears. It looks like that the bubble 122 is broken by pinching inward by the two fingers so as to unlock the touch screen 110.

Furthermore, if the user's two fingers do not directly touch the boundary 120 of the bubble 122, the bubble 122 could change simultaneously while the two touch signals 112, 114 move. In other words, when the two touch signals 112, 114 do not touch the boundary 120 yet, the processor 150 still controls that the boundary 120 changes with the moving track of the two touch signals 112, 114, wherein the processor 150 controls that the diameter of the boundary 120 decreases step by step with the decrease of the second relative distance 118 when the first relative distance 116 is larger than the second relative distance 118, or the processor 150 controls that the diameter of the boundary 120 increases step by step with the increase of the second relative distance 118 when the first relative distance 116 is smaller than the second relative distance 118. The changing rate of the boundary 120 could be the changing rate of the second relative distance 118.

Figure 3A:
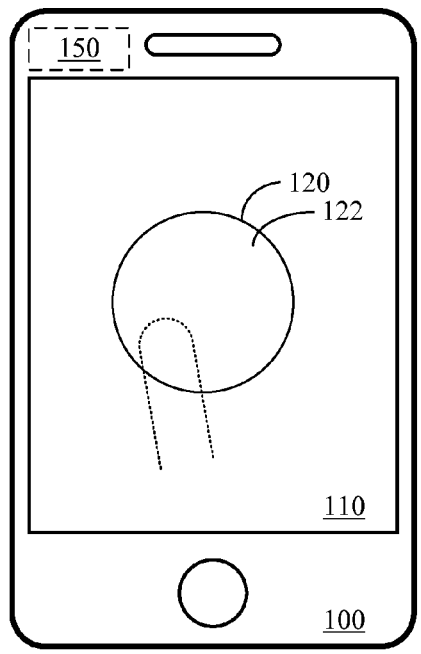
Figure 3B:
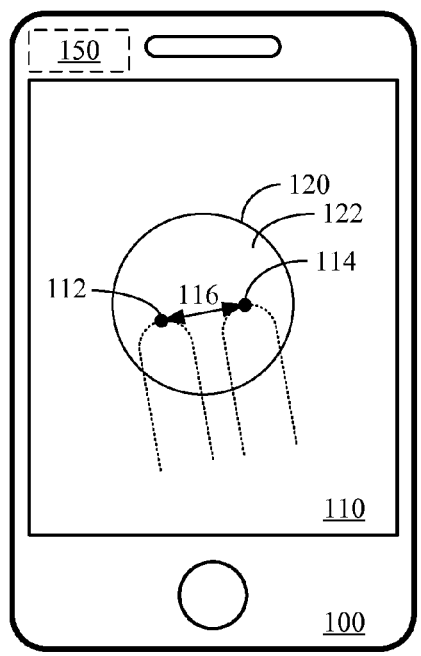
Figure 3C:
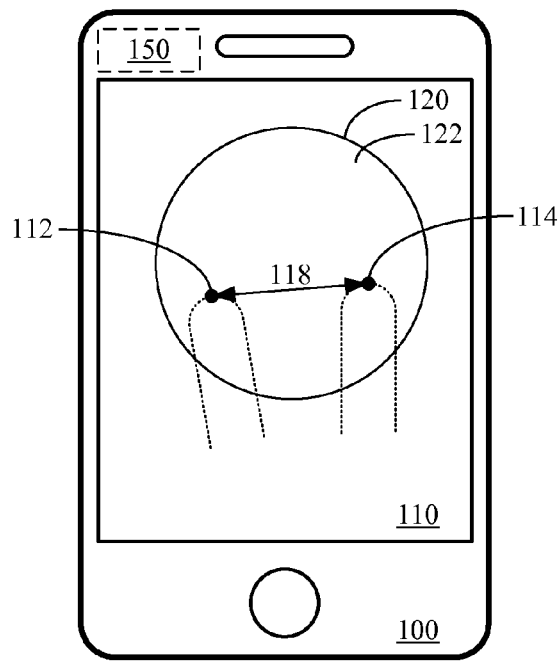

According to another one embodiment of the present invention, when a user wants to unlock the locked touch screen 110 of a smart phone, the user's one finger touches the touch screen 110 at first so that the locked touch screen 110 displays a bubble 122 with a boundary 120, as shown in FIG. 3A. Then, the user's two fingers could touch the inside of the bubble 122, and then the two fingers separately move outward so as to expand the boundary 120 of the bubble 122 with the changing rate of the outward movement of the two fingers, as shown in FIGS. 3B and 3C. When the difference between a first distance between the two fingers before moving, and a second distance between the two fingers after moving (the difference between the first relative distance 116 and the second relative distance 118) is larger than a default value, the touch screen 110 is unlocked and simultaneously displays that the bubble 122 is broken and then disappears. It looks like that the bubble 122 is broken by pulling outward by the two fingers so as to unlock the touch screen 110, wherein the two fingers and the bubble 122 are separated in space during operation.

Figure 4A:
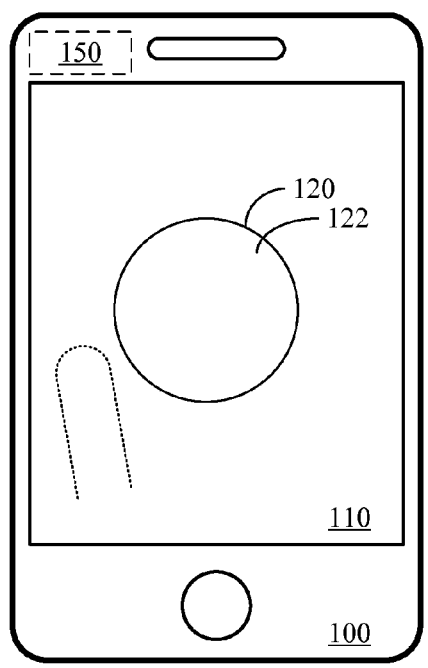
Figure 4B:
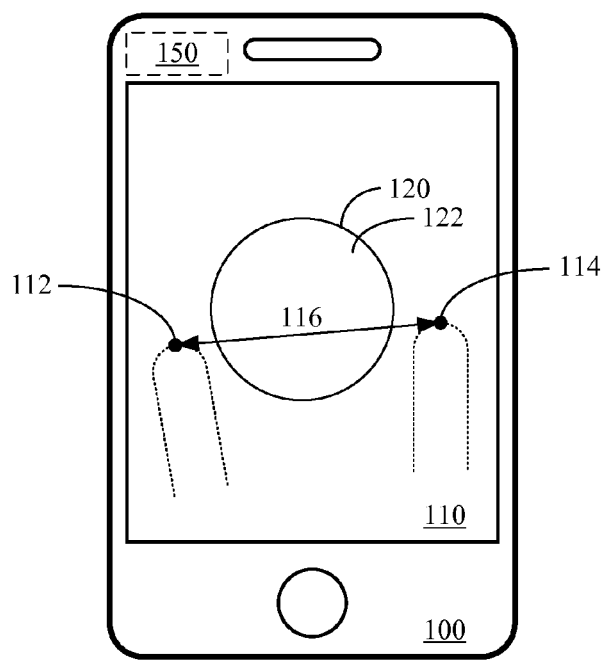
Figure 4C:
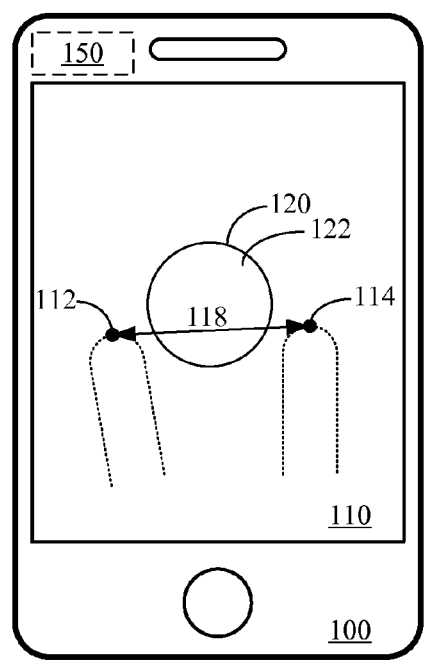

According to another one embodiment of the present invention, when a user wants to unlock the locked touch screen 110 of a smart phone, the user's one finger touches the touch screen 110 at first so that the locked touch screen 110 displays a bubble 122 with a boundary 120, as shown in FIG. 4A. Then, the user's two fingers could touch the outside of the bubble 122, and then the two fingers separately move inward so as to reduce the boundary 120 of the bubble 122 with the changing rate of the inward movement of the two fingers, as shown in FIGS. 4B and 4C. When the difference between a first distance between the two fingers before moving, and a second distance between the two fingers after moving (the difference between the first relative distance 116 and the second relative distance 118) is larger than a default value, the touch screen 110 is unlocked and simultaneously displays that the bubble 122 is broken and then disappears. It looks like that the bubble 122 is broken by pinching inward by the two fingers so as to unlock the touch screen 110, wherein the two fingers and the bubble 122 are separated in space during operation.

Besides, if the user's two fingers do not directly touch the boundary 120 of the bubble 122, the bubble 122 could preserve the original form until the two touch signals 112, 114 touch the boundary 120. Then, the boundary 120 changes with the moving track of the two touch signals 112, 114 after the two touch signals 112, 114 touch the boundary 120. In other words, when the two touch signals 112, 114 do not touch the boundary 120 yet, the processor 150 controls that the boundary 120 does not change, and when the two touch signals 112, 114 touch the boundary 120, the processor 150 controls that the boundary 120 changes with the moving track of the two touch signals 112, 114, wherein the processor 150 controls that the diameter of the boundary 120 decreases step by step with the decrease of the second relative distance 118 when the first relative distance 116 is larger than the second relative distance 118, or the processor 150 controls that the diameter of the boundary 120 increases step by step with the increase of the second relative distance 118 when the first relative distance 116 is smaller than the second relative distance 118. The changing rate of the boundary 120 could be the changing rate of the second relative distance 118.

Figure 5A:
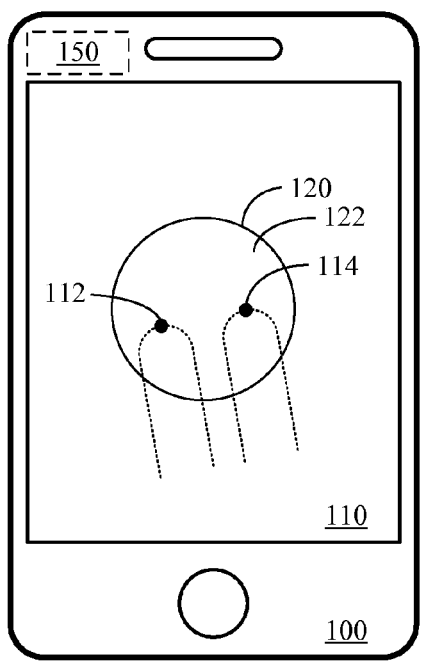
Figure 5B:
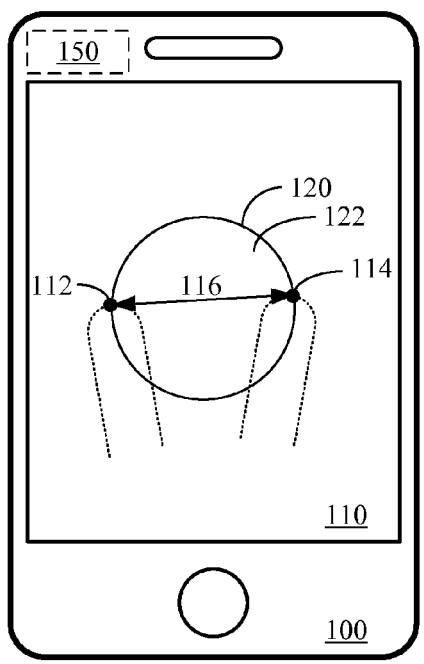
Figure 5C:
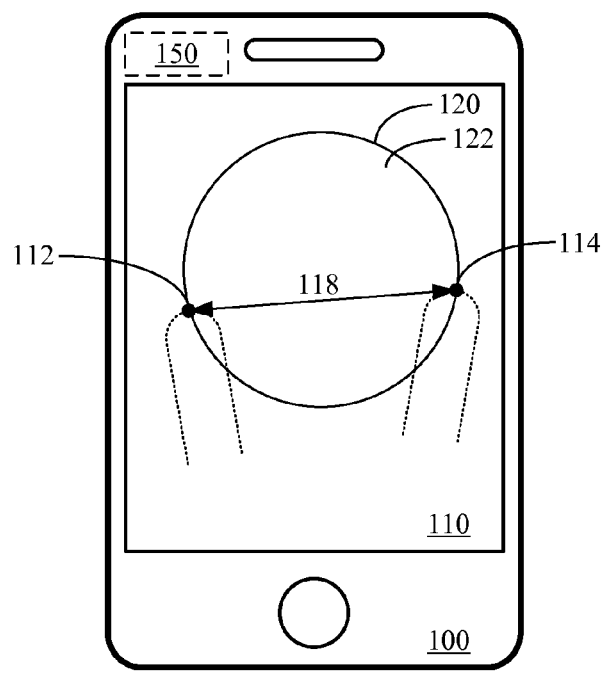

According to another one embodiment of the present invention, as shown in FIG. 5A to 5C, when a user wants to unlock the locked touch screen 110 of a smart phone, the user's one finger touches the touch screen 110 at first so that the locked touch screen 110 displays a bubble 122 with a boundary 120. Then, the user's two fingers could touch the inside of the bubble 122, and then the two fingers separately move outward to the boundary 120 of the bubble 122. Before the two fingers touch the boundary 120, the bubble 122 preserves the original form. When the two fingers continue to move outward after touching the boundary 120 of the bubble 122, the boundary 120 of the bubble 122 expands with the outward movement of the two fingers. When the difference between a first distance between the two fingers before moving, and a second distance between the two fingers after moving (the difference between the first relative distance 116 and the second relative distance 118) is larger than a default value, the touch screen 110 is unlocked and simultaneously displays that the bubble 122 is broken and then disappears. It looks like that after the two fingers touch the bubble 122, the bubble 122 is broken by pulling outward by the two fingers so as to unlock the touch screen 210.

Figure 6A:
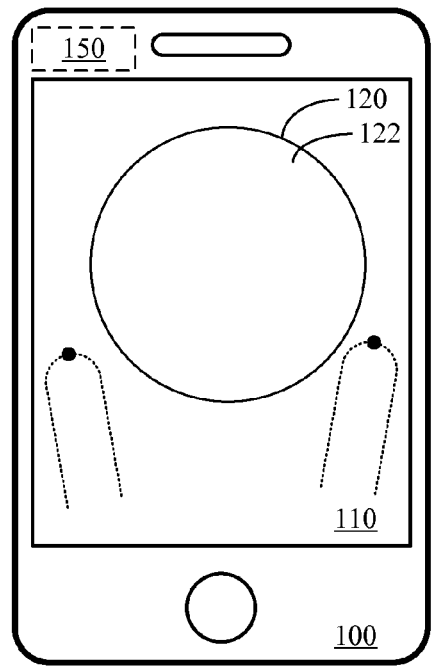
Figure 6B:
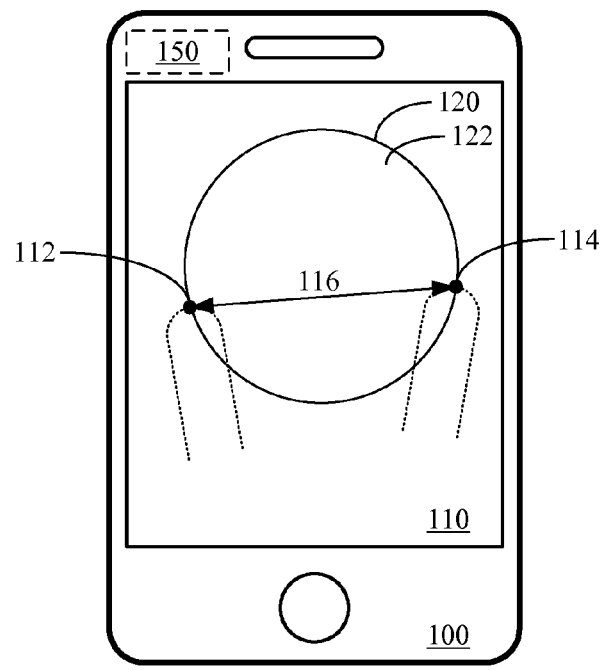
Figure 6C:
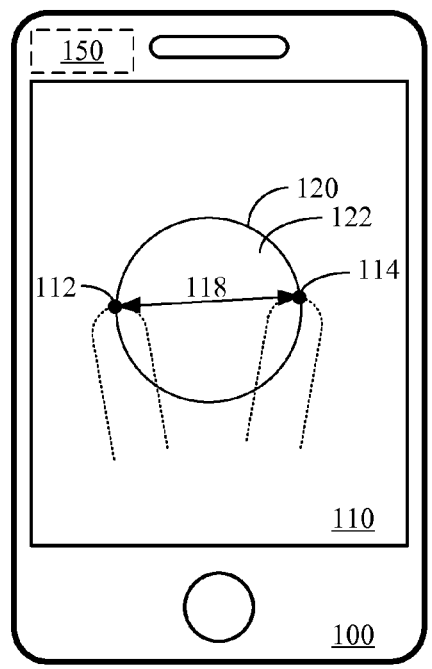

According to another one embodiment of the present invention, as shown in FIG. 6A to 6C, when a user wants to unlock the locked touch screen 110 of a smart phone, the user's one finger touches the touch screen 110 at first so that the locked touch screen 110 displays a bubble 122 with a boundary 120. Then, the user's two fingers could touch the outside of the bubble 122, and then the two fingers separately move inward to the boundary 120 of the bubble 122. Before the two fingers touch the boundary 120, the bubble 122 preserves the original form. When the two fingers continue to move inward after touching the boundary 120 of the bubble 122, the boundary 120 of the bubble 122 reduces with the inward movement of the two fingers. When the difference between a first distance between the two fingers before moving, and a second distance between the two fingers after moving (the difference between the first relative distance 116 and the second relative distance 118) is larger than a default value, the touch screen 110 is unlocked and simultaneously displays that the bubble 122 is broken and then disappears. It looks like that after the two fingers touch the bubble 122, the bubble 122 is broken by pinching inward by the two fingers so as to unlock the touch screen 110.

As mentioned above, the present invention further provides an electronic device 200 for unlocking a touch screen. The electronic device 200 includes a touch screen 210 and a processor 250, as shown in FIG. 7B and FIG. 7C. The processor 250 executes the following operations. At first, while the touch screen 210 detects at least one of two touch signals 212, 214 moving, a relative distance 216 between two touch signals 212, 214 are determined. Then, when the relative distance 216 is larger than or smaller than a default value, the touch screen 210 is unlocked.

Figure 7A:
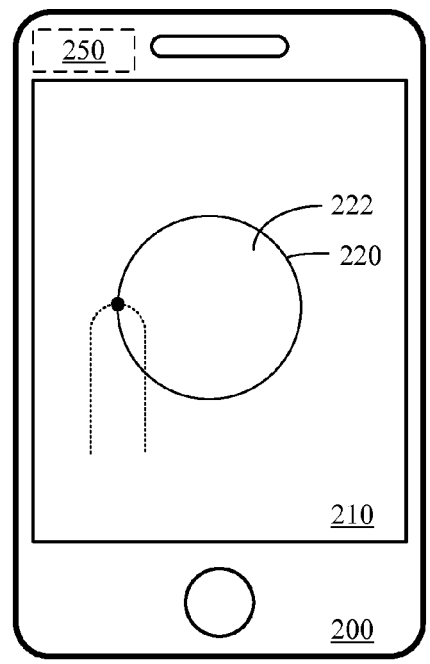
Figure 7B:
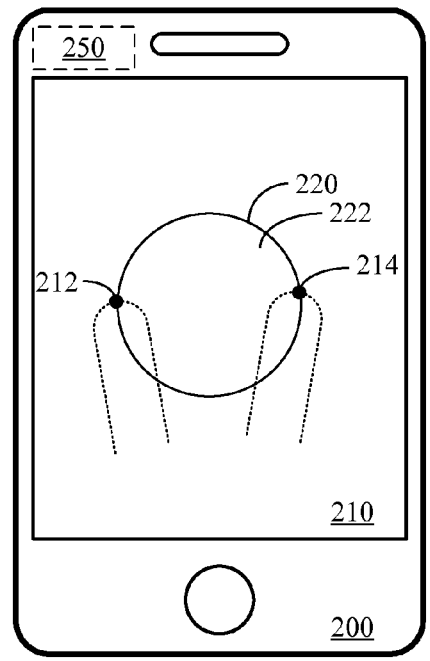
Figure 7C:
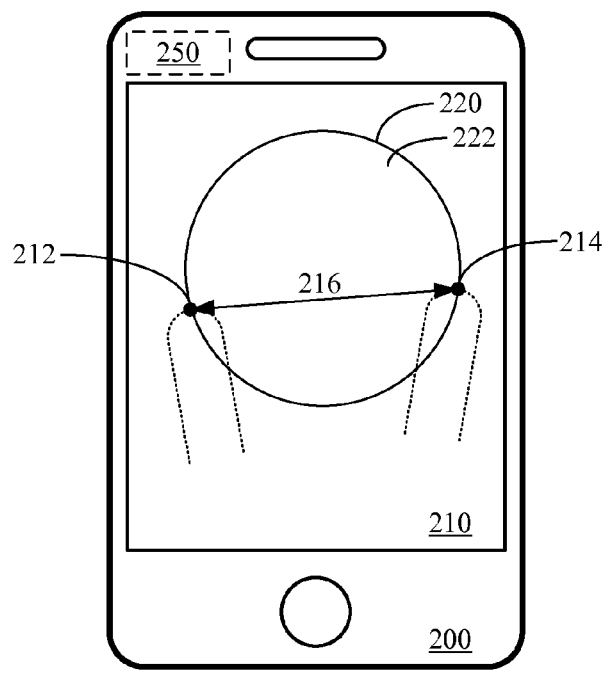

Please refer to FIG. 7A, for displaying an operation frame to unlock the touch screen 210 before the touch screen 210 detects both touch signals 212, 214, the processor 250 further executes the following operations. When the locked touch screen 110 detects at least one touch signal, the processor 250 controls that the touch screen 110 displays a graph with a boundary, wherein the graph could be a closed curve, for example, a bubble 222 with a boundary 220. Finally, when the processor 250 unlocks the locked touch screen 210, the processor 250 vanishes the graph (bubble 222).

The boundary 220 changes with the moving track of the two touch signals 212, 214 as one of the following states: the processor 250 controls that the diameter of the boundary 220 decreases gradually when the relative distance 216 decreases gradually; and the processor 250 controls that the diameter of the boundary 220 increases gradually when the relative distance 216 increases gradually.

According to the previous method, the present invention provides an embodiment, as shown in FIG. 7A to 7C, when a user wants to unlock the locked touch screen 210 of a smart phone (electronic device 200), the user's one finger (the previous at least one touch signal is generated due to the finger) touches the touch screen 210 at first so as to display an operation frame on the locked touch screen 110 for unlocking the locked state. In this embodiment, the operation frame includes a graph with a boundary, wherein the graph with the boundary could be a closed curve, for example, a bubble 222 with a boundary 220. Then, the user's two fingers (the previous two touch signals 212, 214 are generated due to the two fingers) could touch the boundary 220 of the bubble 222, and then the two fingers separately move outward so as to expand the boundary 220 of the bubble 222 with the outward movement of the two fingers. When the relative distance between the two fingers is larger than a default value, the touch screen 210 is unlocked and simultaneously displays that the bubble 222 disappears after broken. It looks like that the bubble 222 is broken by pulling outward by the two fingers so as to unlock the touch screen 210.

Figure 8A:
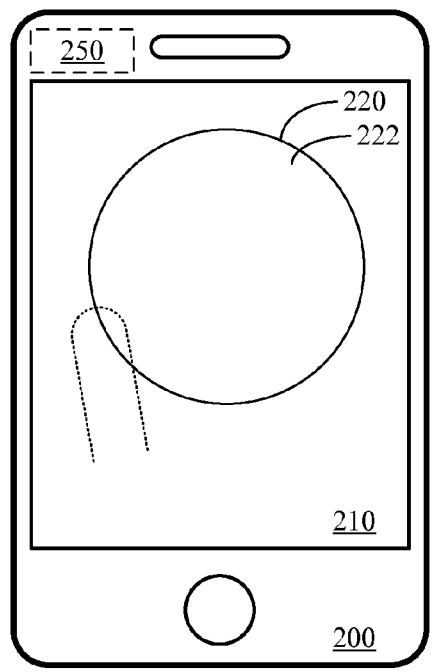
Figure 8B:
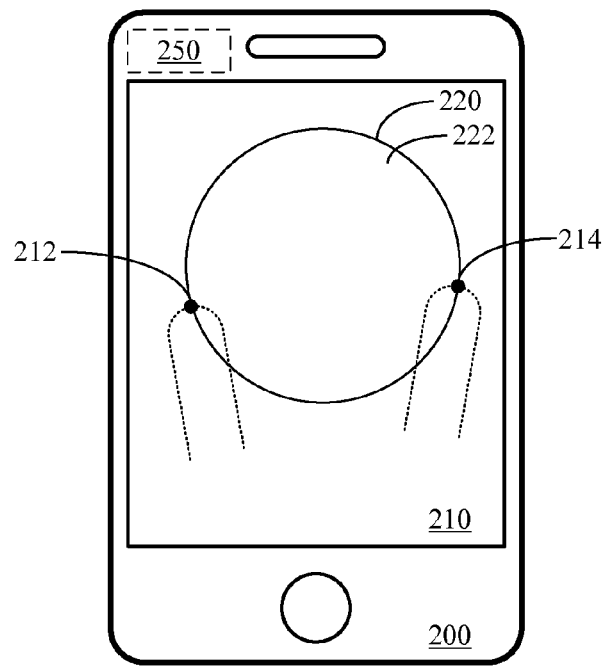
Figure 8C:
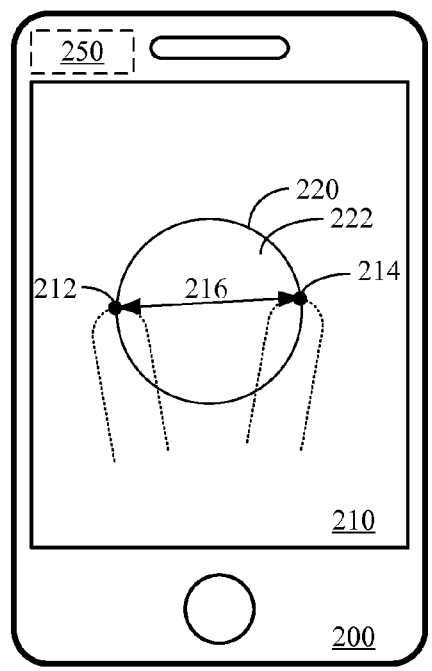

According to another one embodiment of the present invention, as shown in FIG. 8A to FIG. 8C, when a user wants to unlock the locked touch screen 210 of a smart phone, the user's one finger touches the touch screen 210 at first so that the locked touch screen 210 displays a bubble 222 with a boundary 220. Then, the user's two fingers could touch the boundary 220 of the bubble 222, and then the two fingers separately move inward so as to reduce the boundary 220 of the bubble 222 with the inward movement of the two fingers. When the relative distance 216 between the two fingers is smaller than a default value, the touch screen 210 is unlocked and simultaneously displays that the bubble 222 disappears after broken. It looks like that the bubble 222 is broken by pinching inward by the two fingers so as to unlock the touch screen 210.

Furthermore, if the user's two fingers do not directly touch the boundary 220 of the bubble 222, the bubble 222 could change simultaneously while the two touch signals 212, 214 move. In other words, when the two touch signals 212, 214 do not touch the boundary 220 yet, the processor 250 still controls that the boundary 220 changes with the moving track of the two touch signals 212, 214, wherein the processor 250 controls that the diameter of the boundary 220 decreases gradually when the relative distance 216 decreases gradually, or the processor 250 controls that the diameter of the boundary 220 increases gradually when the relative distance 216 increases gradually. The changing rate of the boundary 220 could be the changing rate of the relative distance 216.

Figure 9A:
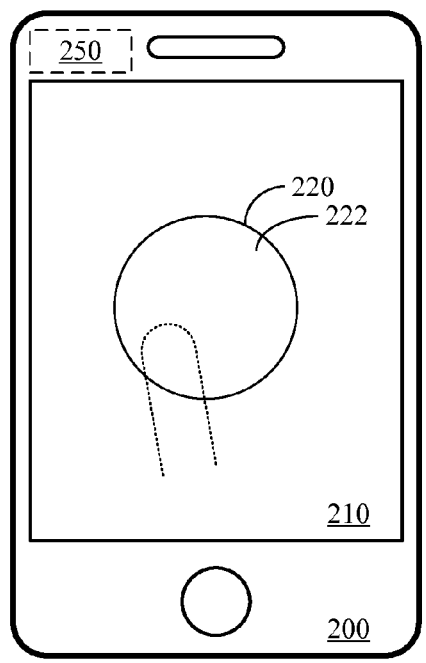
Figure 9B:
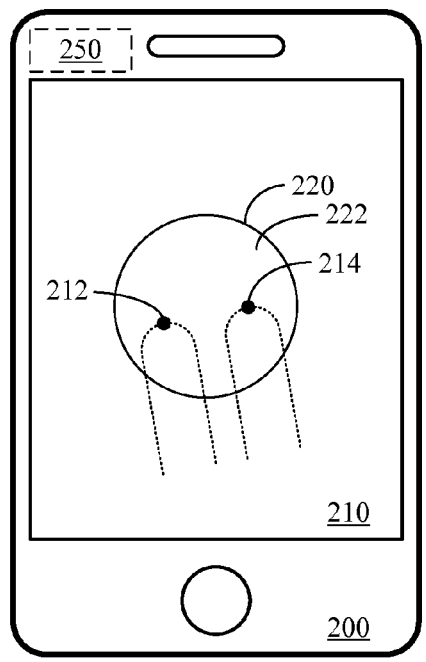
Figure 9C:
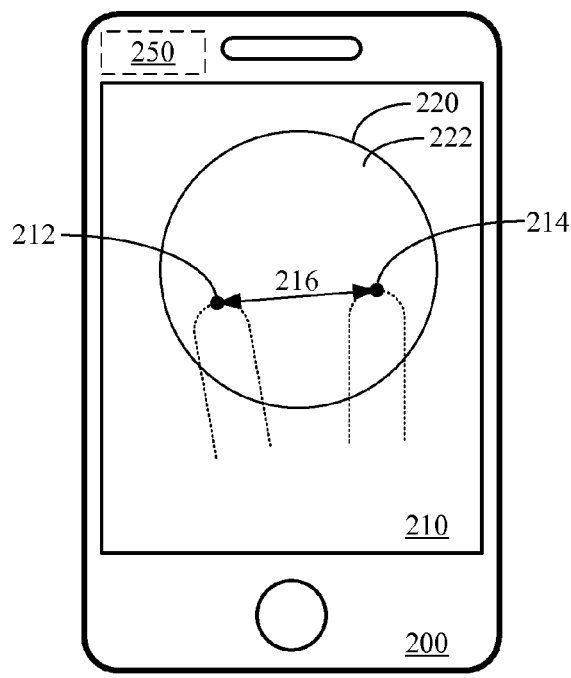

According to another one embodiment of the present invention, as shown in FIG. 9A to 9C, when a user wants to unlock the locked touch screen 210 of a smart phone, the user's one finger touches the touch screen 210 at first so that the locked touch screen 210 displays a bubble 222 with a boundary 220. Then, the user's two fingers could touch the inside of the bubble 222, and then the two fingers separately move outward so as to expand the boundary 220 of the bubble 222 with the changing rate of the outward movement of the two fingers. When the relative distance between the two fingers is larger than a default value, the touch screen 210 is unlocked and simultaneously displays that the bubble 222 is broken and then disappears. It looks like that the bubble 222 is broken by pulling outward by the two fingers so as to unlock the touch screen 210, wherein the two fingers and the bubble 222 are separated in space during operation.

Figure 10A:
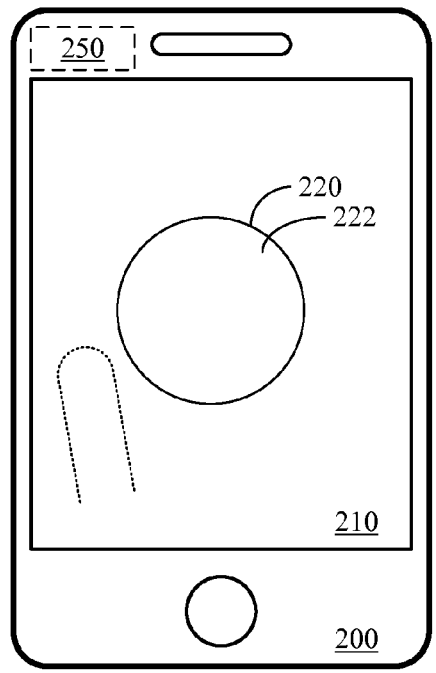
Figure 10B:
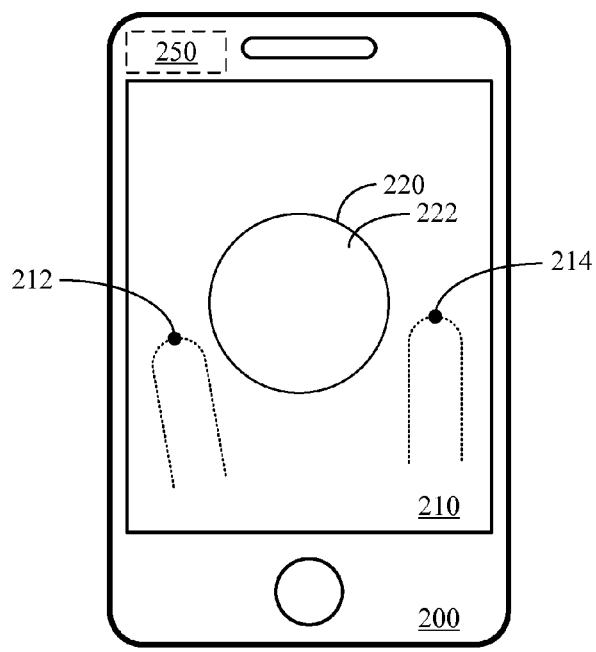
Figure 10C:
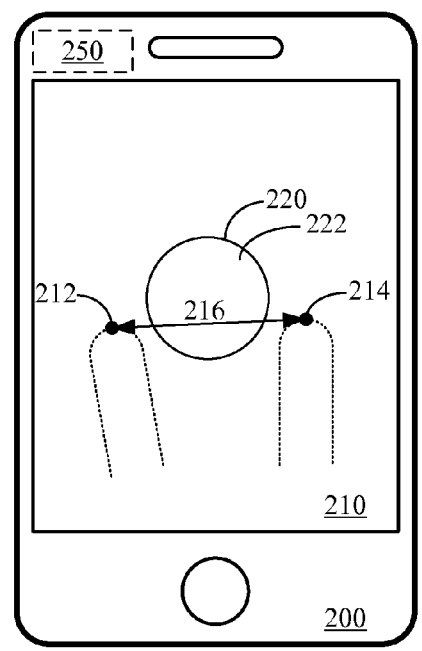

According to another one embodiment of the present invention, as shown in FIG. 10A to FIG. 10C, when a user wants to unlock the locked touch screen 210 of a smart phone, the user's one finger touches the touch screen 210 at first so that the locked touch screen 210 displays a bubble 222 with a boundary 220. Then, the user's two fingers could touch the outside of the bubble 222, and then the two fingers separately move inward so as to reduce the boundary 220 of the bubble 222 with the changing rate of the inward movement of the two fingers. When the relative distance 216 between the two fingers is smaller than a default value, the touch screen 210 is unlocked and simultaneously displays that the bubble 222 is broken and then disappears. It looks like that the bubble 222 is broken by pinching inward by the two fingers so as to unlock the touch screen 210, wherein the two fingers and the bubble 220 are separated in space during operation.

Besides, if the user's two fingers do not directly touch the boundary 220 of the bubble 222, the bubble 222 could preserve the original form until the two touch signals 212, 214 touch the boundary 220. Then, the boundary 220 changes with the moving track of the two touch signals 212, 214 after the two touch signals 212, 214 touch the boundary 220. In other words, when the two touch signals 212, 214 do not touch the boundary 220 yet, the processor 250 controls that the boundary 220 does not change, and when the two touch signals 212, 214 touch the boundary 220, the processor 250 controls that the boundary 220 changes with the moving track of the two touch signals 212, 214, wherein the processor 250 controls that the diameter of the boundary 220 decreases gradually when the relative distance 216 decreases gradually, or the processor 250 controls that the diameter of the boundary 220 increases gradually when the relative distance 216 increases gradually. The changing rate of the boundary 220 could be the changing rate of the relative distance 216.

Figure 11A:
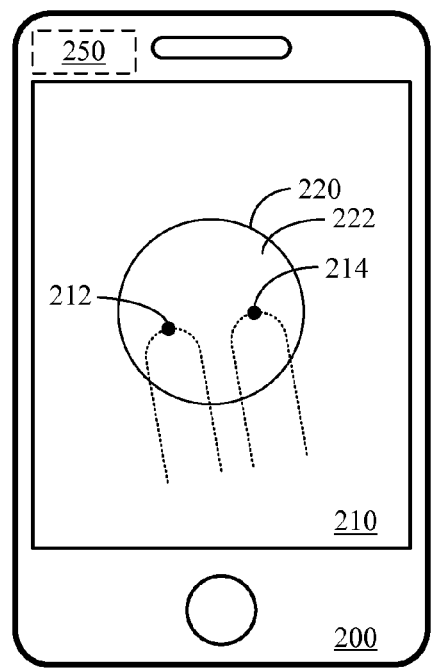
Figure 11B:
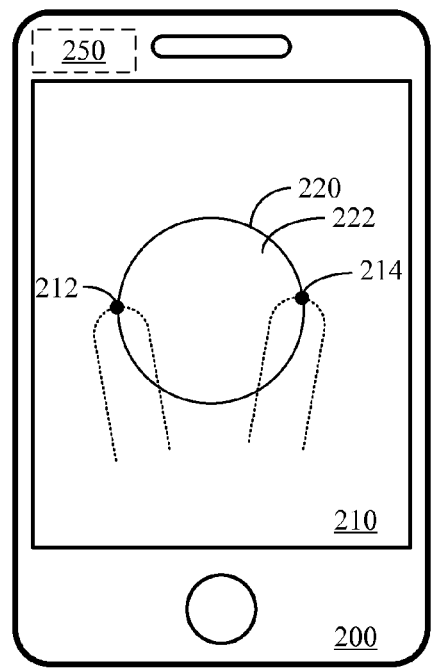
Figure 11C:
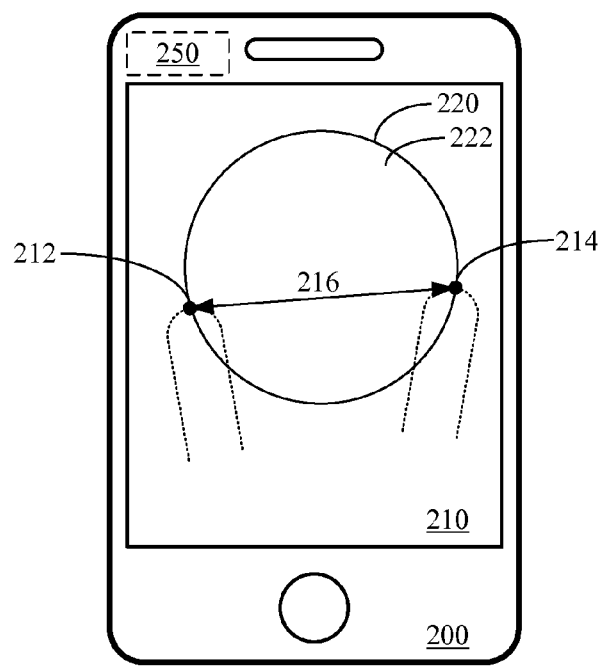

According to another one embodiment of the present invention, as shown in FIG. 11A to FIG. 11C, when a user wants to unlock the locked touch screen 210 of a smart phone, the user's one finger touches the touch screen 210 at first so that the locked touch screen 210 displays a bubble 222 with a boundary 220. Then, the user's two fingers could touch the inside of the bubble 222, and then the two fingers separately move outward to the boundary 220 of the bubble 222. Before the two fingers touch the boundary 220, the bubble 222 preserves the original form. When the two fingers continue to move outward after touching the boundary 220 of the bubble 222, the boundary 220 of the bubble 222 expands with the outward movement of the two fingers. When the relative distance 216 between the two fingers is larger than a default value, the touch screen 210 is unlocked and simultaneously displays that the bubble 222 is broken and then disappears. It looks like that after the two fingers touch the bubble 222, the bubble 222 is broken by pulling outward by the two fingers so as to unlock the touch screen 210.

Figure 12A:
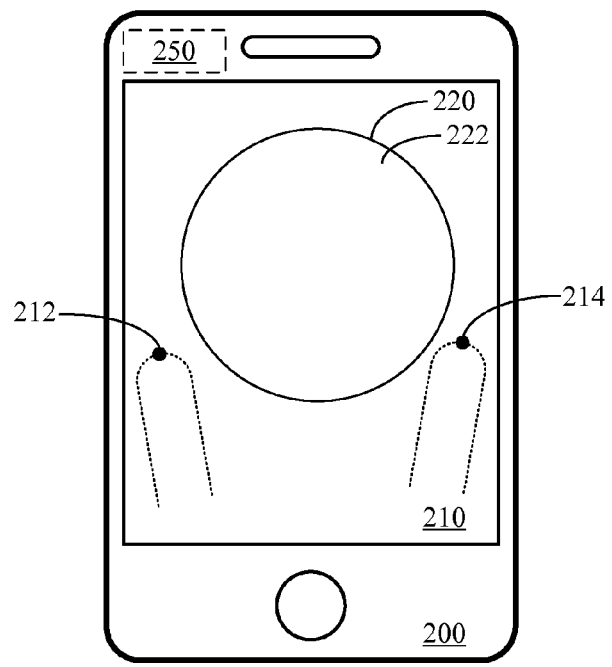
Figure 12B:
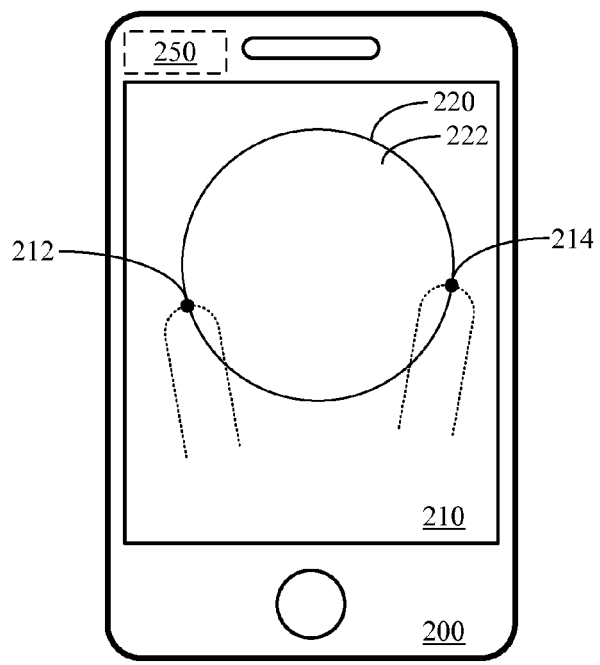
Figure 12C:
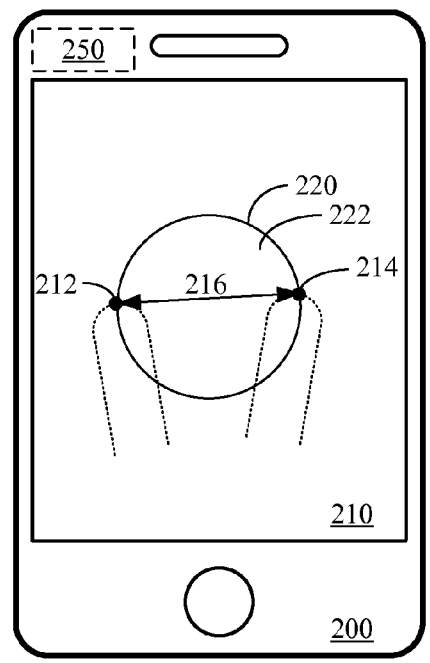

According to another one embodiment of the present invention, as shown in FIG. 12A to FIG. 12C, when a user wants to unlock the locked touch screen 210 of a smart phone, the user's one finger touches the touch screen 210 at first so that the locked touch screen 210 displays a bubble 222 with a boundary 220. Then, the user's two fingers could touch the outside of the bubble 222, and then the two fingers separately move inward to the boundary 220 of the bubble 222. Before the two fingers touch the boundary 220, the bubble 222 preserves the original form. When the two fingers continue to move inward after touching the boundary 220 of the bubble 222, the boundary 220 of the bubble 222 reduces with the inward movement of the two fingers. When the relative distance between the two fingers is smaller than a default value, the touch screen 210 is unlocked and simultaneously displays that the bubble 222 is broken and then disappears. It looks like that after the two fingers touch the bubble 222, the bubble 222 is broken by pinching inward by the two fingers so as to unlock the touch screen 210.

Figure 13:
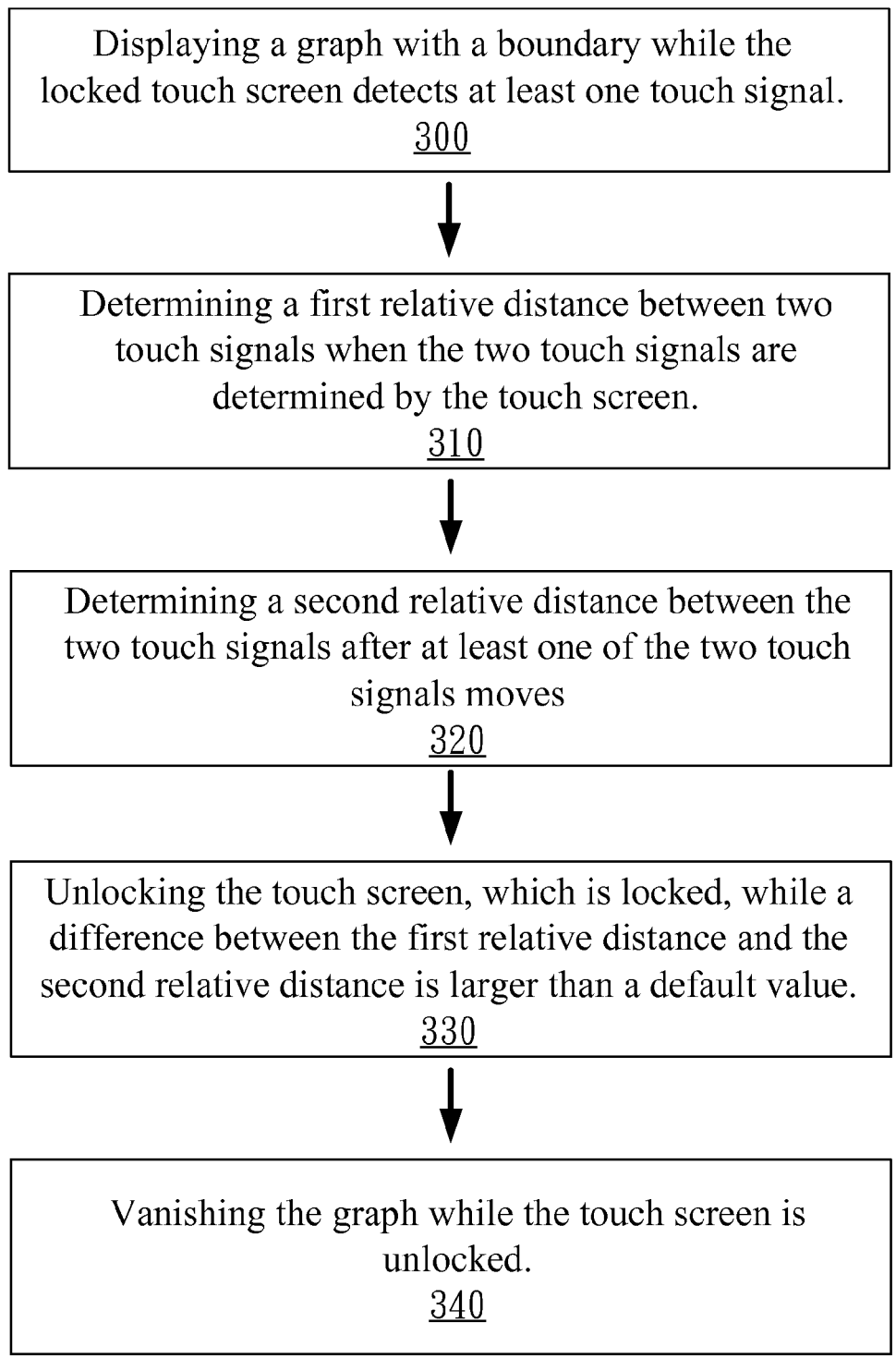
FIGS. 13 and 14 are flowcharts of a method for unlocking a touch screen according to one embodiment of the present invention.

Accordingly, The present invention discloses a method for unlocking a touch screen of an electronic device. The method comprises the following steps, as shown in FIG. 13. At first, in step 310, a first relative distance between two touch signals is determined when the two touch signals are determined by the touch screen. Next, in step 320, a second relative distance between the two touch signals is determined after at least one of the two touch signals moves. Then, in step 330, when a difference between the first relative distance and the second relative distance is larger than a default value, the locked touch screen is unlocked.

According to the previous embodiment, before the touch screen detects the two touch signals, the method further comprises the following step 300 of displaying a graph with a boundary (e.g. the previous bubble) while the touch screen, which is locked, detects at least one touch signal. At this time, the user's two fingers could touch the boundary of the bubble directly to execute the following step 310 to step 330, wherein the boundary changes with the moving track of the two touch signals as one of the following states: the diameter of the boundary decreases step by step with the decrease of the second relative distance when the first relative distance is larger than the second relative distance; and the diameter of the boundary increases step by step with the increase of the second relative distance when the first relative distance is smaller than the second relative distance. The changing rate of the boundary equals to the changing rate of the second relative distance.

In addition, if the user's two fingers do not directly touch the boundary of the bubble, the bubble does not change until the two fingers touch the boundary. In other words, the boundary preserves the original form before the two touch signals touch the boundary, and the first relative distance is started to be determined after the two touch signals touch the boundary. Then, the boundary changes with the moving track of the two touch signals, wherein the diameter of the boundary decreases step by step with the decrease of the second relative distance when the first relative distance is larger than the second relative distance; or the diameter of the boundary increases step by step with the increase of the second relative distance when the first relative distance is smaller than the second relative distance. The changing rate of the boundary equals to the changing rate of the second relative distance.

Furthermore, if the user's two fingers do not directly touch the boundary of the bubble, the bubble could change simultaneously while the two touch signals move. In other words, when the two touch signals do not touch the boundary yet, the boundary still changes with the moving track of the two touch signals, wherein the diameter of the boundary decreases step by step with the decrease of the second relative distance when the first relative distance is larger than the second relative distance, or the diameter of the boundary increases step by step with the increase of the second relative distance when the first relative distance is smaller than the second relative distance. The changing rate of the boundary could be the changing rate of the second relative distance.

Finally, the method further comprises a step 340 of vanishing the graph while the touch screen is unlocked.

Figure 14:
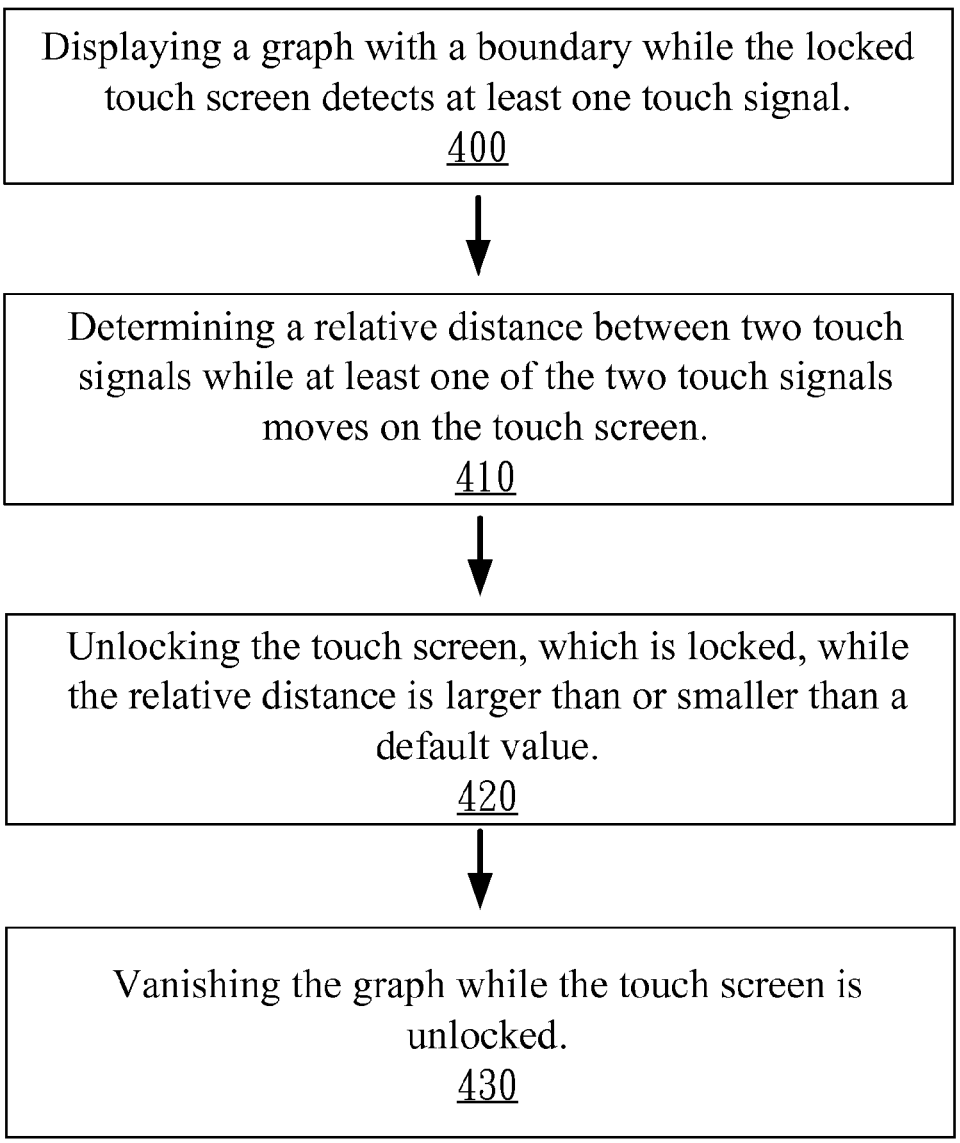

The present invention further discloses a method for unlocking a touch screen of an electronic device. The method comprises the following steps, as shown in FIG. 14. At first, in step 410, a relative distance between two touch signals is determined while at least one of the two touch signals moves on the touch screen. Next, in step 420, the locked touch screen is unlocked while the relative distance is larger than or smaller than a default value.

According to the previous embodiment, before the touch screen detects the two touch signals, the method further comprises the following step 400 of displaying a graph with a boundary (e.g. the previous bubble) while the touch screen, which is locked, detects at least one touch signal. At this time, the user's two fingers could touch the boundary of the bubble directly to execute the following step 410 and step 420, wherein the boundary changes with the moving track of the two touch signals as one of the following states: the diameter of the boundary decreases gradually when the relative distance decreases gradually; and the diameter of the boundary increases gradually when the relative distance increases gradually. The changing rate of the boundary equals to the changing rate of the relative distance.

In addition, if the user's two fingers do not directly touch the boundary of the bubble, the bubble does not change until the two fingers touch the boundary. In other words, the boundary preserves the original form before the two touch signals touch the boundary, and the relative distance between the two touch signals is started to be determined after the two touch signals touch the boundary. Then, the boundary changes with the moving track of the two touch signals, wherein the diameter of the boundary decreases gradually when the relative distance decreases gradually; or the diameter of the boundary increases gradually when the relative distance increases gradually. The changing rate of the boundary equals to the changing rate of the relative distance.

Furthermore, if the user's two fingers do not directly touch the boundary of the bubble, the bubble could change simultaneously while the two touch signals move. In other words, when the two touch signals do not touch the boundary yet, the boundary still changes with the moving track of the two touch signals, wherein the diameter of the boundary decreases gradually when the relative distance decreases gradually, or the diameter of the boundary increases gradually when the relative distance increases gradually. The changing rate of the boundary could be the changing rate of the relative distance.

Finally, the method further comprises a step 430 of vanishing the graph while the touch screen is unlocked.

It's worth noting that the method for unlocking a touch screen could be executed by any electronic device including one or more processors. In other words, the previous embodiments could be designed as a computer program including a plurality of source codes, and the computer program could be stored in a computer-readable recording medium (e.g. compact disks, floppy disks, USB flash drive and so on). After the computer program is loaded into the electronic device, the method for unlocking a touch screen described as above could be executed by the electronic device.

Accordingly, the electronic device, the method and the recording medium for unlocking a touch screen display a graph with a boundary on the locked touch screen. Then two fingers touch the outside, the inside or the boundary of the graph to move outward or inward separately. Finally, the touch screen of the electronic device is unlocked or keeps locking based on whether the distance between the moved two fingers is larger or smaller than a default value, or whether the distance difference between the two fingers before and after moving is larger than a default value. Thus, the present invention provides users other ways to unlock a touch screen.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. An electronic device for unlocking a touch screen, comprising:
   the touch screen; and
   a processor, executing the following operations:
      displaying a continuous circular boundary on the touch screen while the touch screen is locked upon detecting a first touch signal, wherein said first touch signal is on said boundary;
      detecting a second touch signal on said boundary at a first relative distance from said first touch signal, while said first touch signal remains on said boundary;
      changing a size of said boundary according to a second relative distance between said first touch signal and said second touch signal after at least one of said first touch signal or said second touch signal moves; and unlocking the touch screen when a difference between the first relative distance and the second relative distance is larger than a predetermined value, wherein the first relative distance and the second relative distance are greater than zero.

2. The electronic device of claim 1, wherein the processor further executes the following operation of vanishing the boundary while the processor unlocks the touch screen.

3. The electronic device of claim 1, wherein the processor controls that the boundary changes with a movement of said first touch signal or said second touch signal as one of the following states:
   the processor controls that the diameter of the boundary decreases step by step with the decrease of the second relative distance when the first relative distance is larger than the second relative distance; and
   the processor controls that the diameter of the boundary increases step by step with the increase of the second relative distance when the first relative distance is smaller than the second relative distance.

4. The electronic device of claim 1, wherein the boundary changes at a rate equal to a rate of change of the second relative distance.

5. An electronic device for unlocking a touch screen, comprising:
   the touch screen; and
   a processor, executing the following operations:
      displaying a continuous circular boundary on the touch screen while the touch screen is locked upon detecting a first touch signal, wherein said first touch signal is on said boundary;
      detecting a second touch signal on said boundary at a relative distance from said first touch signal, while said first touch signal remains on said boundary;
      changing a size of said boundary according to the relative distance between said first touch signal and said second touch signal after at least one of said first touch signal or said second touch signal moves; and
      unlocking the touch screen while the relative distance is larger than or smaller than a predetermined value, wherein the relative distance is greater than zero.

6. The electronic device of claim 5, wherein the processor further executes the following operation of vanishing the boundary while the processor unlocks the touch screen.

7. The electronic device of claim 5, wherein the processor controls that the boundary changes with a movement of said first touch signal or said second touch signal as one of the following states:
   the processor controls that the diameter of the boundary decreases gradually when the relative distance decreases gradually; and
   the processor controls that the diameter of the boundary increases gradually when the relative distance increases gradually.

8. The electronic device of claim 5, wherein the boundary changes at a rate equal to a rate of change of the relative distance.

9. A method for unlocking a touch screen of an electronic device, comprising:
   displaying a continuous circular boundary on the touch screen while the touch screen is locked upon detecting a first touch signal, wherein said first touch signal is on said boundary;
   detecting a second touch signal on said boundary at a first relative distance from said first touch signal, while said first touch signal remains on said boundary;
   changing a size of said boundary according to a second relative distance between said first touch signal and said second touch signal after at least one of said first touch signal or said second touch signal moves; and
   unlocking the touch screen when a difference between the first relative distance and the second relative distance is larger than a predetermined value, wherein the first relative distance and the second relative distance are greater than zero.

10. The method of claim 9, further comprising the following step of vanishing the boundary while the touch screen is unlocked.

11. The method of claim 9, wherein the boundary changes with a movement of said first touch signal or said second touch signal as one of the following states:
   the diameter of the boundary decreases step by step with the decrease of the second relative distance when the first relative distance is larger than the second relative distance; and
   the diameter of the boundary increases step by step with the increase of the second relative distance when the first relative distance is smaller than the second relative distance.

12. The method of claim 9, wherein the boundary changes at a rate equal to a rate of change of the second relative distance.

13. A method for unlocking a touch screen of an electronic device, comprising:
   displaying a continuous circular boundary on the touch screen while the touch screen is locked upon detecting a first touch signal, wherein said first touch signal is on said boundary;
   detecting a second touch signal on said boundary at a relative distance from said first touch signal, while said first touch signal remains on said boundary;
   changing a size of said boundary according to the relative distance between said first touch signal and said second touch signal after at least one of said first touch signal or said second touch signal moves; and
   unlocking the touch screen while the relative distance is larger than or smaller than a predetermined value, wherein the relative distance is greater than zero.

14. The method of claim 13, further comprises the following step of vanishing the boundary while the touch screen is unlocked.

15. The method of claim 13, wherein the boundary changes with a movement of said first touch signal or said second touch signal as one of the following states:
   the diameter of the boundary decreases gradually when the relative distance decreases gradually; and
   the diameter of the boundary increases gradually when the relative distance increases gradually.

16. The method of claim 13, wherein the boundary changes at a rate equal to a rate of change of the relative distance.

17. A processor for unlocking a touch screen, executing:
   displaying a continuous circular boundary on the touch screen while the touch screen is locked upon detecting a first touch signal, wherein said first touch signal is on said boundary;
   detecting a second touch signal on said boundary at a first relative distance from said first touch signal, while said first touch signal remains on said boundary;
   changing a size of said boundary according to a second relative distance between said first touch signal and said second touch signal after at least one of said first touch signal or said second touch signal moves; and unlocking the touch screen when a difference between the first relative distance and the second relative distance is larger than a predetermined value, wherein the first relative distance and the second relative distance are greater than zero.

\* \* \* \* \*